Patented Nov. 20, 1945

2,389,150

UNITED STATES PATENT OFFICE 2,389,150

ALDEHYDE CONDENSATION PRODUCTS AND PROCESSES OF PRODUCING THE SAME

David W. Jayne, Jr., Old Greenwich, and Harold M. Day, Cos Cob, Conn., assignors to American Cyanamid Company, New York, N. Y., a corporation of Maine No Drawing. Application February 28, 1941, Serial No. 381,140

10 Claims. (Cl. 260—38)

This invention relates to condensation products of an aldehyde and a product obtained by heating dicyandiamide and a primary aromatic amine such as aniline.

An object of the present invention is to provide condensation products, particularly resinous condensation products, which have desirable properties and which are economical to produce.

Another object of this invention is to prepare resinous materials from products obtained by heating dicyandiamide with aniline.

These and other objects are attained by condensing an aldehyde such as formaldehyde with the products obtained by heating a primary aromatic amine such as aniline, preferably under reflux, with dicyandiamide, the molecular ratio of aniline to dicyandiamide being from about 1:2 up to about 1:3.2. If the ratio of aniline to dicyandiamide be from about 1:2 to 1:2.7, a suitable catalyst such as zinc chloride is employed during the heating operation. At ratios of aniline to dicyandiamide between 1:2.7 and 1:3.2 the heating is preferably carried out in the absence of catalytic materials.

The following examples in which the proportions are in parts by weight are given by way of illustration and not in limitation.

EXAMPLE 1

| | Parts |
|---|---|
| Product "A" | 165 |
| Formalin (37% formaldehyde in water) | 324 |

This mixture is placed in a suitable reaction vessel and refluxed for ½–2 hours, thereby producing a substantially clear syrup having a light purple reddish tinge. If desired any insoluble material which may be present may be filtered out and optionally the syrup may be treated with decolorizing charcoal.

The resin syrup prepared in accordance with this example may be applied to paper, dried, cut, stacked and placed between hot platens at a temperature between 135° and 150° C. for several minutes. A light-colored laminated material having good electrical properties and good light resistance is produced.

100 parts of a syrup prepared according to the present example is mixed with about 40 parts of alpha-cellulose pulp and heated to about 65–75° C. until it is substantially dry. The mixture is then ground in a ball mill, for example, and during this grinding a suitable mold lubricant may be added such as zinc stearate or calcium stearate (about 0.5%). Any dyes, pigments, curing catalysts, etc., which may be desired may be incorporated into the composition during this grinding operation. After the grinding or mixing is complete the product is a molding powder which is suitable for molding under heat and pressure. Thus the molding powder produced in the aforementioned manner may be placed in a suitable mold under a pressure of 2000–3500 pounds per square inch which is maintained at a temperature of about 135–165° C. for from 3 to 5 minutes. A molding relatively light in color having excellent electrical properties and good heat and water resistance is obtained.

EXAMPLE 2

| | Parts |
|---|---|
| Product "A" | 165 |
| Urea | 52 |
| Isopropanol | 111 |
| Formalin (37% formaldehyde in water) | 282 |

This mixture is refluxed (at about 85° C.) for 1½–2½ hours in a suitable reaction vessel, thereby producing a syrup which is fairly stable over a relatively long period of time. This syrup may be used for the production of laminated materials or in the production of molding compositions in the same general manner as described in Example 1.

The presence of the isopropanol is desirable in order to produce products having low viscosity. The isopropanol can be replaced in whole or in part by other water-miscible alcohols, e. g., ethyl alcohol. If ethyl alcohol be substituted for the isopropanol in such a manner that the resin solids are about 45%, a syrup is produced which is somewhat more viscous than that produced using isopropanol as set forth above.

EXAMPLE 3

| | Parts |
|---|---|
| Product "A" | 100 |
| Formalin (37% formaldehyde in water) | 243 |
| Butanol | 100 |
| Decolorizing charcoal | 10 |

The mixture is placed in a suitable reaction chamber provided with an agitator and a reflux condenser, as well as a trap arranged so that the reflux condensate passes through it on its return to the reaction chamber, whereby the essentially aqueous fraction of the condensate is separated from the essentially non-aqueous fraction thereof, the latter being returned to the reaction chamber. The mixture is heated up to reflux and maintained at this point for about 2 minutes or until product "A" is dissolved. The solution is then filtered and the filtrate which is reddish in color is heated to reflux temperature and azeotropically distilled, optionally under reduced pressure. Alternatively, wet butanol may be distilled off and dry butanol added at about the same rate. When the dehydration is substantially complete, a small amount of white precipitate (2 parts) may be formed which is filtered off. The resulting lacquer which has a reddish tinge is clear and is miscible with about an equal proportion of butanol and xylol. This lacquer is stable for several months and upon standing a short while it separates into a substantially water-white layer on the bottom and a reddish layer on the top. Films of the lacquer may be baked, either with or without the addition of a small amount of an acid catalyst, for about 30 minutes at 100° C. and for an additional 30 minutes at 150° C. The baked films are clear and hard and they do not crack upon cooling.

*Preparation of product "A"*

| | Parts |
|---|---|
| Dicyandiamide | 700 |
| Aniline | 240 |

This mixture is charged into a jacketed kettle, preferably stainless steel or glass-lined, provided with an agitator and a reflux condenser. The mixture is agitated and the heating medium which is circulated through the jacket of the kettle is raised to about 190–200° C. and maintained at this point for about 2–4 hours. As soon as the temperature of the reaction mixture reaches about 190° C., ammonia is given off rapidly and the amount of reflux increases considerably because of the heat released by the exothermic reaction. When the reaction is complete as evidenced by the homogeneity of the mass, as well as by the drop in temperature of the reaction mass (due to the lack of further exothermic reaction), the reaction mixture is discharged from the kettle and cooled. The cooled product which is a hard brittle mass is then ground to produce a substantially dry, light-colored powder which is reactive with formaldehyde to produce condensation products suitable for many varied purposes.

Generally speaking, product "A" may be prepared by reacting from 2–3.2 mols of dicyandiamide with about 1 mol of a primary aromatic amine such as aniline at temperatures above about 160–165° C., preferably under reflux for a time sufficient to liberate a substantial amount of ammonia. The process of reacting dicyandiamide with aniline in the presence of a catalyst and wherein the molecular ratio of amine to dicyandiamide is about 1:2 to about 1:2.7 is described in our copending application Serial No. 381,139, entitled "Processes of producing chemical compositions and products thereof," and filed Feb. 28, 1941. The process of reacting a primary aromatic amine such as aniline with dicyandiamide in the absence of a catalyst wherein the molecular ratio is from about 1:2.7 to about 1:3.2 is described in our copending application Serial No. 381,138, entitled "Chemical compositions and processes of producing same," and filed February 28, 1941.

The primary aromatic amines which are suitable for use according to our invention include aniline and the primary aromatic amines which boil above about 180° C. Examples of suitable amines other than aniline are: each of the toluidines, each of the xylidines, each of the diphenyl amines, each of the diamino-diphenyls such as p,p'-diamino-diphenyl, naphthyl amine, etc. Various mixtures of the amines may also be used. The amines should be in the form of the free base and not in the form of salts thereof in order to obtain our products.

The temperature of the reaction mixture of amine and dicyandiamide should be raised gradually to the desired point. If zinc chloride catalyst be used in accordance with the present invention a minimum temperature of about 160–165° C. is required for the reaction. Preferably the temperature is at about the reflux point of the amine, i. e., for aniline, about 184–190° C. If no catalyst be used, the reaction temperature should be raised gradually up to about 190° C. Most of our processes are carried out at temperatures in the neighborhood of 200–300° C. but our invention contemplates the use of temperatures up to about 400° C. in some instances. Gradually the temperature drops after the completion of the exothermic reaction and the reaction products may be discharged from the reaction chamber and cooled after the temperature begins to drop.

Our reaction is carried out at ordinary pressure, preferably at atmospheric pressure. By ordinary pressure we mean up to about 3 atmospheres.

Since our process is conducted in the absence of high pressures which are often utilized in the production of materials from dicyandiamide which are to be used in resin preparation, it has many economic as well as technical advantages.

During our process of heating dicyandiamide and aniline or other amine a substantial amount of ammonia is liberated throughout the exothermic reaction. By the term "a substantial amount of ammonia," we mean at least about 0.1–0.5 mol of ammonia per mol of dicyandiamide. Our process is carried out under substantially anhydrous conditions in order to obtain the desired products. By the term "substantially anhydrous conditions" we contemplate the use of ordinary dry commercial materials without the addition of water to the reactants.

Other aldehyde or mixtures of aldehydes may be substituted for part or all of the formaldehyde used in the above examples. Among these there are: acetaldehyde, propionaldehyde, butyraldehyde, hexaldehyde, heptaldehyde, crotonaldehyde, allyl aldehyde, benzaldehyde, cinnamyl aldehyde, furfural, etc. Furthermore, the formaldehyde may be in gaseous or polymeric form, in aqueous solution, in alcoholic solution, etc.

The condensation products may be produced by any suitable process with any desired combining ratio of aldehyde to the products obtained by heating a primary aromatic amine with dicyandiamide. The molal ratio of aldehyde such as formaldehyde to the products obtained by heating a primary aromatic amine with dicyandiamide may be varied widely from about 1:1 up to about 5:1 and in some instances even higher ratios may be used although in the latter case, free formaldehyde is generally given off during the curing of the resinous materials. Since the average molecular weight of our products has not been accurately determined, the ratio of our mixed products to aldehyde expressed on a weight basis is preferably about 3:1 to 2:3.

The condensation products may be alkylated if desired with any suitable alcohols such as methanol, ethanol, propanol, butanol, amyl alcohol, cyclohexanol, octanol, benzyl alcohol, etc.

If desirable as indicated in Example 2 other materials reactive with aldehydes may be mixed with our products obtained by heating dicyandiamide with a primary aromatic amine such as aniline and condensed with an aldehyde, such as, for example, formaldehyde. For this purpose phenol, urea, thiourea, aminotriazines such as melamine, etc., may be used. The pH at which the condensation of aldehyde with the products obtained by heating dicyandiamide with aniline may be varied considerably, a pH of about 6–9 being generally preferable.

In the preparation of our molding compositions, suitable fillers may be used including not only cellulosic materials such as paper or wood pulp but also asbestos fibers, mica, abrasive materials such as silicon carbide, garnet, bort, glass fibers, foliated glass, etc. Desired pigments or dyes may also be included not only in our molding compositions but in our coating compositions, e. g., titanium dioxide, zinc oxide, ferric oxide, Prussian blue, toluidine red, malachite green, etc.

Suitable curing catalysts such as acidic materials or substances which yield acid at molding temperature may be added to our condensation products in order to facilitate the curing thereof to the substantially infusible, substantially insoluble form. Furthermore, various plasticizers may be incorporated into our compositions and in the case of molding compounds mold lubricants may be included. Coating compositions containing our alkylated condensation products desirably include a polycarboxylic acid-polyhydric alcohol resin modified with suitable fatty acids, especially the drying oil fatty acids, cellulose derivatives such as nitrocellulose, phenol-formaldehyde resins, etc. Plasticizers such as dibutyl phthalate, tricresyl phosphate, etc., also have utility in our coating compositions.

Aldehyde condensation products of our products obtained by heating a primary aromatic amine with dicyandiamide are suitable for use in the production of aqueous syrups for use in the preparation of laminated materials, in coating or impregnating paper and textiles, for example, to size or increase the wet strength of the former, or to provide a finish or crease resistance to the latter. Materials impregnated with our resinous materials may be utilized in the electrical industry as well as in many other fields. Our condensation products are suitable for the production of molding compositions and they may also be used in the production of coating compositions, especially lacquer types of materials such as those prepared in Example 3.

Other uses for our products are as adhesives such as plywood adhesives, as binders for abrasives, in brake linings, for affixing dyes to fabrics, for insolubilizing materials such as dyes, etc. Our compositions may be used in the form of emulsions and as dry powders after suitable dehydration.

Obviously many modifications and variations in the processes and compositions described above may be made without departing from the spirit and scope of the invention as defined in the appended claims.

We claim:

1. A process which comprises heating an aldehyde with the solid product obtained by heating at ordinary pressure under substantially anhydrous conditions 1 mol of a primary aromatic amine with about 2–3.2 mols of dicyandiamide at a temperature and for a time sufficient to liberate a substantial amount of ammonia.

2. A process which comprises heating an aldehyde with the solid product obtained by heating at ordinary pressure under substantially anhydrous conditions 1 mol of aniline with about 2.7–3.2 mols of dicyandiamide at a temperature and for a time sufficient to liberate a substantial amount of ammonia.

3. A process which comprises heating an aldehyde with the solid product obtained by heating at ordinary pressure under substantially anhydrous conditions 1 mol of aniline with about 2–2.7 mols of dicyandiamide in the presence of zinc chloride at a temperature and for a time sufficient to liberate a substantial amount of ammonia.

4. A process which comprises heating formaldehyde with the solid product obtained by heating at ordinary pressure under substantially anhydrous conditions 1 mol of aniline with about 2.7–3.2 mols of dicyandiamide at a temperature and for a time sufficient to liberate a substantial amount of ammonia.

5. A condensation product of an aldehyde with the solid substance obtained by heating at ordinary pressure under substantially anhydrous conditions 1 mol of a primary aromatic amine with about 2–3.2 mols of dicyandiamide at a temperature and for a time sufficient to liberate a substantial amount of ammonia.

6. A condensation product of an aldehyde with the solid substance obtained by heating at ordinary pressure under substantially anhydrous conditions 1 mol of aniline with about 2.7–3.2 mols of dicyandiamide at a temperature and for a time sufficient to liberate a substantial amount of ammonia.

7. A condensation product of formaldehyde with the solid substance obtained by heating at ordinary pressure under substantially anhydrous conditions 1 mol of aniline with about 2.7–3.2 mols of dicyandiamide at a temperature and for a time sufficient to liberate a substantial amount of ammonia.

8. A molding composition comprising a filler and a condensation product of an aldehyde with the solid substance obtained by heating at ordinary pressure under substantially anhydrous conditions 1 mol of a primary aromatic amine with about 2–3.2 mols of dicyandiamide at a temperature and for a time sufficient to liberate a substantial amount of ammonia.

9. An alkylated condensation product of an aldehyde with the solid substance obtained by heating at ordinary pressure under substantially anhydrous conditions 1 mol of a primary aromatic amine with about 2–3.2 mols of dicyandiamide at a temperature and for a time sufficient to liberate a substantial amount of ammonia, said condensation product being alkylated by heating with an alcohol.

10. A butylated condensation product of an aldehyde with the solid substance obtained by heating at ordinary pressure under substantially anhydrous conditions 1 mol of a primary aromatic amine with about 2–3.2 mols of dicyandiamide at a temperature and for a time sufficient to liberate a substantial amount of ammonia, said condensation product being butylated by heating with a butyl alcohol.

DAVID W. JAYNE, JR.
HAROLD M. DAY.